United States Patent [19]

Nugent, Jr. et al.

[11] Patent Number: 5,108,832

[45] Date of Patent: Apr. 28, 1992

[54] FLEXIBLE INTUMESCENT COATING COMPOSITION

[75] Inventors: Richard M. Nugent, Jr., Allison Park; Thomas A. Ward, Gibsonia; Paul P. Greigger, Allison Park; Jerome A. Seiner, Pittsburgh, all of Pa.

[73] Assignee: PPG Industries, Inc., Pittsburgh, Pa.

[21] Appl. No.: 589,368

[22] Filed: Sep. 28, 1990

[51] Int. Cl.⁵ .......................... B32B 3/26; C09K 21/14
[52] U.S. Cl. .............................. 428/304.4; 428/305.5; 428/921; 521/85; 521/92; 521/178; 521/907; 523/179
[58] Field of Search ................ 428/304.4, 305.5, 921; 521/85, 92, 178, 907; 523/179

[56] References Cited

U.S. PATENT DOCUMENTS

| | | |
|---|---|---|
| 3,487,349 | 12/1969 | Halloran . |
| 4,088,806 | 5/1978 | Sawko et al. ............... 523/179 |
| 4,529,467 | 7/1985 | Ward et al. . |
| 4,595,714 | 6/1986 | McAllister et al. .......... 523/179 |
| 4,656,095 | 4/1987 | McAllister et al. .......... 523/179 |
| 4,764,539 | 8/1988 | Ladang ...................... 523/179 |

FOREIGN PATENT DOCUMENTS 51-114433 10/1976 Japan .
2071111 9/1981 United Kingdom .

OTHER PUBLICATIONS

"Zinc Borate as a Flame Retardant and Smoke Suppressant in Epoxy Systems", K. K. Shen and R. W. Sprague, 1982.
"Boron Compounds as Flame Retardants in Polymers", W. G. Woods, 1966.
Firebrake ® ZB in Epoxy Systems, U.S. Borax Service Bulletin, No. 1281.

*Primary Examiner*—Morton Foelak
*Attorney, Agent, or Firm*—Linda Pingitore

[57] ABSTRACT

Disclosed is an intumescent curable composition which contains as a resinous binder a flexible polyepoxide resin. The polyepoxide is cured with an appropriate curing agent adapted for the particular resin. An additive component is present which contains a mixture of materials which provide a source of
(i) zinc,
(ii) boron,
(iii) phosphorus, and
(iv) an expansion gas upon thermal decomposition. The composition is capable of forming a carbonaceous char upon exposure to heat or flame, with the proviso that the cured, unburned composition has sufficient flexibility that is passes at least 10 continuous cycles of a cold cycle test without cracking. The cold cycle test involves the following steps: the composition is applied at a thickness of 0.5 inch (12.7 millimeters) to a 10 inch (0.0254 meter) section of a 4W13 I-beam having two thermocouples attached to the surface, allowed to cure at ambient temperature for 16 hours, force cured for 5 days at about 60° C. and subjected to the cold cycle test. For one cycle, the beam is placed in a freezer operating at a temperature between about 0° F. (−18° C.) and about −10° F. (−23° C.) for sufficient time for the steel to reach a temperature between about 0° F. (−18° C.) and about (−10° F.) −23° C. as determined by the two thermocouples attached to the surface of the beam beneath the coating, removed from the freezer and a 50 square inch area (0.0323 square meter) of the surface warmed as shown in FIGS. 1 and 2 by passing a heat gun (Model No. HG 50146, Alpha Division of Loral Corp., 14 amp: minimum temperature at tip 500° F. (260° C.)) a distance of 0.5 inch (12.7 millimeter) from the surface, uniformly over the surface until the surface temperature reaches 110° F. (43° C.) within a 3 minute period, as determined by a thermocouple moved about the surface and allowed to stand for at least 2 hours at ambient temperature.

1 Claim, 1 Drawing Sheet

FLEXIBLE INTUMESCENT COATING COMPOSITION

BACKGROUND OF THE INVENTION

The present invention relates to fire protective intumescent curable compositions.

Over the years, intumescent compositions have been utilized for a variety of structural applications including columns, I-beams, girders, bulk-heads and a variety of other structural building components. A very important requirement of these compositions is the ability to uniformly form a carbonaceous char during a fire which will adhere to the substrate without cracking. In addition, it is very important that the unburned composition adhere well to the substrate without cracking in order to protect the underlying substrate from damage brought about by climatic exposure and also for the composition to be in good condition should a fire occur. A composition which is already cracked in the unburned state provides a diminished level of protection to the underlying substrate once it burns and forms a char since there is a greater likelihood that the char formed during a fire will fall from the substrate leaving it unprotected.

A major cause of cracking in the unburned state is the climatic conditions to which the composition is exposed. For example, dramatic temperature shifts from very hot to very cold within a short period of time such as over the course of a day contribute to stresses within the composition which may lead to cracking.

There is a need, therefore, for a curable intumescent composition which is capable of adhering to a substrate without cracking in the unburned state, even when exposed to extreme changes in temperature and weather conditions; and in addition which is capable of intumescing to form a uniform carbonaceous char upon exposure to heat or flame thereby protecting the underlying substrate from the structural damage which may be brought about by a fire.

SUMMARY OF THE INVENTION

In accordance with the present invention, there is provided a intumescent curable composition comprising:
(a) a polyepoxide resin,
(b) a curing agent adapted to cure the polyepoxide resin,
(c) an additive component comprising a mixture of materials adapted to provide a source of
  (i) zinc,
  (ii) boron,
  (iii) phosphorus and
  (iv) an expansion gas upon thermal decomposition, said composition being capable of forming a carbonaceous char upon exposure to heat or flame, with the proviso that the cured, unburned composition has sufficient flexibility that it passes at least 10 continuous cycles of a cold cycle test without cracking when the composition is applied at a thickness of 0.5 inch (12.7 millimeters) to a 10 inch (0.254 meter) section of a 4W13 I-beam having two thermocouples attached to the surface, allowed to cure at ambient temperature for 16 hours, force cured for 5 days at about 60° C. and subjected to the cold cycle test wherein for one cycle the beam is placed in a freezer operating at a temperature between about 0° F. (−18° C.) and about −10° F. (−23° C.) for sufficient time for the steel to reach a temperature between about 0° F. (−18° C.) and about (−10° F.) −23° C. as determined by the two thermocouples attached to the surface of the beam beneath the coating, removed from the freezer and a 50 square inch area (0.0323 square meter) of the surface warmed as shown in FIGS. 1 and 2 by passing a heat gun (Model No. HG 50146, Alpha Division of Loral Corp, 14 amp: minimum temperature at tip 500° F. (260° C.)) a distance of 0.5 inch (12.7 millimeter) from the surface, uniformly over the surface until the surface temperature reaches 110° F. (43° C.) within a 3 minute period, as determined by a thermocouple moved about the surface, and allowed to stand for at least 2 hours at ambient temperature.

Also provided in accordance with the present invention is a substrate which demonstrates a reduced rate of temperature rise when it is subjected to fire conditions.

DETAILED DESCRIPTION OF THE INVENTION

An intumescent curable composition according to the present invention comprises a polyepoxide resin, a curing agent adapted to cure the polyepoxide resin, and an additive component which comprises a mixture of materials adapted to provide a source of zinc, boron, phosphorus and an expansion gas upon thermal decomposition. The composition is capable of forming a carbonaceous char upon exposure to heat or flame and has sufficient flexibility when cured to pass at least 10 continuous cycles of a cold cycle test which is described more fully below, without cracking. The cold cycle test has been observed to be an excellent predictor of the flexibility of the claimed compositions when exposed to extreme temperature changes within a short time period.

The cold cycle test is conducted in the following manner. The test substrate, a 10 inch section (0.254 meter) of 4W13 I-beam, is readied by attaching two thermocouples to the surface, each centrally located, in a manner and specific location as described below. The intumescent curable composition is uniformly applied to the I-beam at a thickness of 0.5 inch (12.7 millimeters), covering both thermocouples. The coated beam is then allowed to stand at ambient temperature (23° C.) for 16 hours in order for the intumescent composition to cure. Thereafter, the coated beam is maintained at a temperature of 60° C. for 5 days to force cure the applied coating.

Figure 1:
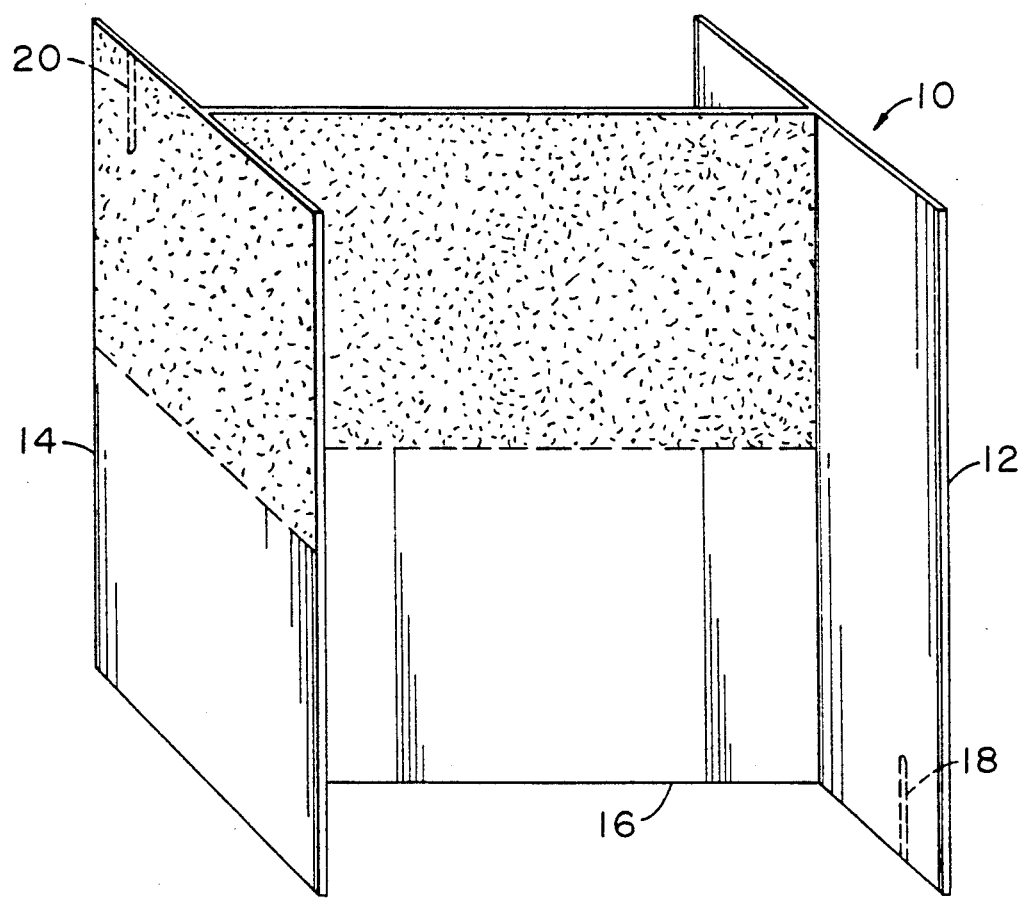
FIG. 1 is an isometric view of a ten (10) inch section of a 4W13 I-beam. The shaded area represents the area of the beam heated with a heat gun during the cold cycle test.
Figure 2:
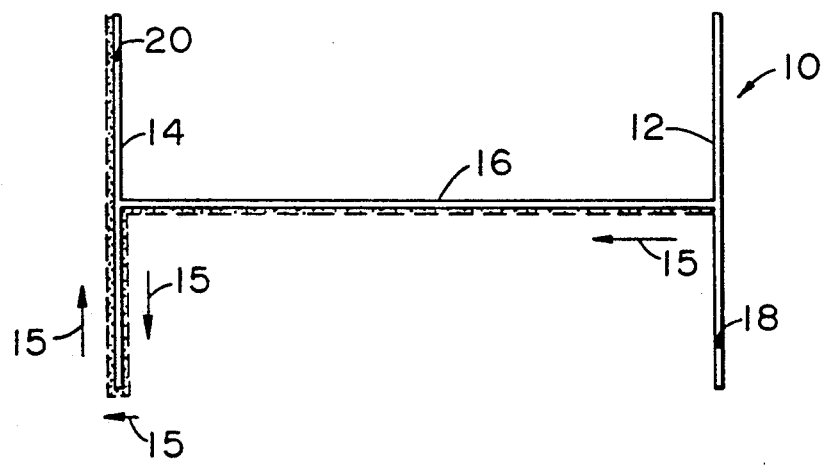
FIG. 2 is a top view of FIG. 1. The direction of heating is shown by the path marked with arrows (15).

The beam is then subjected to the cold cycle test. One complete cycle of the test involves the following steps. The beam is placed in a freezer operating at a temperature between 0° F. (−18° C.) and about −10° F. (−23° C.) for sufficient time for the steel to reach a temperature between about 0° F. (−18° C.) and about −10° F. (−23° C.), as determined by the two thermocouples attached to the surface of the beam beneath the coating. The beam is removed from the freezer and immediately thereafter a 50 square inch area (0.0323 square meter) of the surface is warmed by passing a heat gun uniformly over the surface as shown by the shaded area in FIG. 1 and FIG. 2. For the sake of simplicity, the figures only show the metal core of the beam 10. The layer of intumescent coating composition which is present is admitted but eliminated for ease of discussion. With reference to FIG. 1 and FIG. 2, thermocouples 18 and 20 are placed at adjacent corners of the outer legs 12 and 14 which are separated by web 16, opposite and diagonal to one another. More particularly, in outer leg 12, thermocouple 18 is placed at a depth of three (3) inches into the leg. In outer leg 14, thermocouple 20 is placed at a depth of three (3) inches into the leg. The path followed by the heat gun in warming the surface is shown by the arrows 15 in FIG. 2. A suitable heat gun is a Model No. HG 50146 manufactured by the Alpha Division of Loral Corporation, rated for 14 amperes and heating to a minimum temperature of 500° C. (260° C.) at the tip. Also suitable are heat guns which provide comparable specifications. The gun is held approximately 0.5 inch (12.7 millimeters) from the surface and passed uniformly over the surface until the surface temperature reaches 110° F. (43° C.) within a 3 minute period. The surface temperature is monitored by a thermocouple which is moved about the surface. The beam is then allowed to stand for at least 2 hours at ambient temperature which concludes one complete cycle of the cold cycle test.

The coating compositions of the present invention have sufficient flexibility in the cured, unburned state that they are capable of passing at least 10 continuous cycles of the aforedescribed cold cycle test without cracking.

Preferably, the claimed coating compositions have sufficient flexibility to pass at least 30 continuous cycles, more preferably at least 50 continuous cycles and most preferably at least 70 continuous cycles.

Preferably, the claimed intumescent curable compositions are prepared with a flexible polyepoxide resin. These resins are generally essentially linear materials, although a small amount of branching is tolerated. Exemplary of suitable materials are epoxidized soybean oil, dimer acid based materials such as EMPOL 1010 resin which is commercially available from Emery Chemicals and rubber modified polyepoxide resins such as the product prepared from a polyglycidyl ether of bisphenol A, e.g. EPON 828 from SHELL Chemical, and an acid functional polybutadiene.

Alternatively, in one embodiment, a flexible curing agent can be utilized. One example of such a material is commercially available from B.F. Goodrich, amine terminated butyl-N-rubber (sold as ATBN). One way of preparing a flexible curing agent is by the addition of a flexibilizer to the curable composition which is reactive with the curing agent. For example, urethane acrylate copolymers are particularly suitable for modification of amine functional curing agents. The urethane acrylate copolymers are capable of reacting with the amino groups by a Michael addition reaction.

One particularly preferred example of a flexible polyepoxide for use herein is an epoxy functional adduct which is prepared from a flexible acid functional polyester and polyepoxide.

The acid functional polyester generally has an acid value of at least about 10 mg KOH/g, generally from about 140 to about 350 mg KOH/g and preferably from about 180 to about 260 mg KOH/g, as determined by ASTM 974-87.

Linear polyesters are more preferred than branched polyesters for use herein. Acid functional polyesters can be prepared by the polyesterification of an organic polycarboxylic acid or anhydride thereof with an organic polyol. Usually, the polycarboxylic acids and polyols are aliphatic or aromatic dibasic acids and diols.

The diols which are usually employed in making the polyester include alkylene glycols, such as ethylene glycol, diethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used, although diols are preferred. Examples include trimethylolpropane, trimethylolethane, pentaerythritol, glycerine and the like, as well as higher molecular weight polyols such as those produced by oxyalkylating lower molecular weight polyols.

The acid component of the polyester consists primarily of monomeric dicarboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, tetrabromophthalic acid, decanedioic acid, dodecanedioic acid, and other dicarboxylic acids of varying types, for example, Diels-Alder adducts of unsaturated $C_{18}$ fatty acids such as the product sold by West-Vaco Co. under the trademark DIMER ACID. The polyester may include minor amounts of monobasic acids such as benzoic acid, stearic acid, acetic acid, hydroxystearic acid and oleic acid. Also, there may be employed higher polycarboxylic acids such as trimellitic acid. Where acids are referred to above, it is understood that anhydrides of those acids which form anhydrides can be used in place of the acid. Also, lower alkyl esters of the acids such as dimethyl glutarate and dimethyl terephthalate can be used.

In a preferred embodiment of the present invention, the polyester used to prepare the epoxy functional adduct is prepared from a polycarboxylic acid component comprising a polycarboxylic acid or mixture of acids having from 7 to 16 carbon atoms and a polyol component comprising a portion of diethylene glycol. For example, one preferred embodiment utilizes a mixture of dodecanedioic acid and azeleic acid as the acid component.

The polyepoxide used to prepare the epoxy functional adduct can be aliphatic, aromatic, cyclic, acyclic, alicyclic or heterocyclic. Generally, the epoxide equivalent weight ranges from about 100 to about 1780, preferably 120 to 250, more preferably 125 to 195. Preferably, aromatic epoxide resins are used herein.

One particularly preferred group of aromatic epoxy resins are the polyglycidyl ethers of polyhydric aromatic alcohols, such as, for example, dihydric phenols. The phenol must be at least dihydric and suitable examples include resorcinol, catechol, hydroquinone, bis(4-hydroxyphenyl)-1,1-isobutane; 4,4-dihydroxybenzophenone; bis(4-hydroxyphenyl)-1, 1-ethane; bis(2-hydroxynaphenyl)methane; 1,5-hydroxynaphthalene and 4,4'-isopropylidene-diphenol, i.e., bisphenol A. Preferably bisphenol A is utilized. Of the many epoxy compounds possible, the one principally utilized is epichlorohydrin although epibromohydrin is also quite useful. The polyglycidyl ethers especially useful herein are obtained by reacting epichlorohydrin and bisphenol A in the presence of an alkali such as sodium or potassium hydroxide. The series of epoxy resins sold by Shell Chemical Company under the trademark EPON are especially useful herein.

Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane. Of this group, the polyglycidyl ethers of 1,4-butylene glycol are preferred. Examples of these include RD-2 commercially available from Ciba-Geigy and HELOXY WC-67 from Wilmington Chemical Company.

Also useful are the epoxide resins which are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid.

Still another group of epoxide resins are derived from the epoxidation of an olefinically unsaturated alicyclic material. Among these are the epoxy alicyclic ethers and esters well known in the art.

Besides the materials discussed above, useful epoxy resins also include those containing oxyalkylene groups. Such groups can be pendant from the backbone of the epoxide resin or they can be included as part of the backbone. The proportion of oxyalkylene groups in the epoxy resin depends upon a number of factors, among them, the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenol-formaldehyde condensate. A mixture of epoxy resins can also be used herein.

The acid functional polyester and the polyepoxide are reacted in amounts such that residual epoxy functionality remains. The epoxy equivalent weight of the epoxy functional adduct generally ranges from about 250 to about 600, preferably from about 350 to about 450.

The aforedescribed epoxy functional adduct requires the addition of a curing agent in order to convert it to a cured material. Curing can take place either at ambient temperature or upon application of heat. In general, the curing agents which can be utilized herein can be selected from a variety of materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel under the trademark VERSAMID. Preferably the poly(amine-amide) materials such as VERSAMID or its equivalent are utilized.

Also suitable as curing agents are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride.

Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphite. It should be understood that blocked or latent curing agents can also be utilized if desired; for example, ketimines which are prepared from a polyamine and a ketone, and aldimines which are prepared from a polyamine and an aldehyde.

Also suitable for use herein as a curing agent for the epoxy functional adduct is an amine functional Michael adduct prepared from components comprising a mono-, di- or polyfunctional amine or mixtures thereof and a mono-, di- or polyfunctional acrylate or mixtures thereof. The amine is used in excess to the acrylate. The molar ratio of amine to acrylate used in preparing the Michael adduct generally ranges from about 2:1 to about 1.2:1, preferably from about 1.5:1 to about 1.33:1.

Examples of suitable monoamines include ethanolamine, methyl ethanolamine, isopropanolamine, aniline, n-butyl amine, 2-aminohexane, cyclobutylamine and 2-ethylhexylamine.

Useful di- and polyfunctional amines include hydrazine, ethylene diamine, 1,3-propylene diamine, 1,4-butylene diamine, 1,5-diamino pentane, 1,6-hexamethylene diamine, 1,2-cyclohexamethylene diamine, 1,4-diamino cyclohexane, 1,4-phenylene diamine, meta-xylene diamine, isophorone diamine, 2,4-toluene diamine, trimethyl 1,6-hexamethylene diamine menthane diamine, triethylene glycol diamine and various polyoxypropylene diamines which are commercially available from Texaco under the trademark JEFFAMINE, e.g., JEFFAMINE D-230, D-400, D-500. In addition bishexamethylene triamine; diethylene triamine; dipropylene triamine; polyoxypropylene triamine; triethylene tetramine; tetraethylene pentamine; 2,4-bis(para-aminobenzyl) aniline, aminoethyl piperazine, bis(aminopropyl)piperazine and tris(2-aminoethyl)amine.

Examples of monofunctional acrylates include acrylonitrile, methyl acrylonitrile, acrylamide, N-methylolacrylamide, hydroxyethyl acrylate and hydroxypropyl acrylate. Examples of di- and polyfunctional acrylates include diacrylates of 1,4-butanediol, neopentyl glycol, ethylene glycol, 1,2-propanediol, 2,2,4-trimethyl- 1,3-pentanediol, 1,6-hexanediol, 2,2-dimethyl-3-hydroxypropyl 2,2-dimethyl-3-hydroxypropionate and diols containing a cyclic structure such as 1,4-cyclohexane dimethanol, para-xylene glycol, and 1,4-cyclohexane diol. In addition, the triesters of acrylic acid with trimethylolethane, trimethylolpropane and pentaerythritol.

The amount of epoxy functional adduct and curing agent can vary, but generally, in the instance of the amine curing agents, the equivalent ratio of epoxy to amine is within the range of from about 0.05:1 to about 10:1. Preferably, the epoxy to amine equivalent ratio is within the range of from about 0.1:1 to 2:1 and more preferably within the range of 0.3:1 to 0.9:1.

The additive component of the claimed intumescent composition comprises a mixture of materials adapted to provide a source of phosphorus, zinc, boron, and an expansion gas upon thermal decomposition. In a preferred embodiment the additive component additionally contains a reinforcing filler.

The source of phosphorus can be selected from a variety of materials such as, for example, phosphoric acid, mono- and di-ammonium phosphate, tris-(2-chloroethyl)phosphate, phosphorus-containing amides such as phosphorylamide, and melamine pyrophosphate. Preferably the source of phosphorous is an ammonium polyphosphate represented by the formula:

$$(NH_4)_{n+2}P_nO_{3n+1}$$

wherein n is an integer of at least 2, preferably n is an integer of at least 50. Examples of such materials are those commercially available under the trademark designations PHOS-CHEK-P-30 from Monsanto Corporation, and AMGARD MC from Albright and Wilson Corporation. Preferably, PHOS-CHEK-P-30 is utilized herein. The claimed intumescent composition typically contains an amount of phosphorous which ranges from about 0.05 to about 20 percent by weight, preferably 0.5 to 10 percent by weight, the percentages being based upon the total weight of the epoxy resin, curing agent, and the additive component. The phosphorus is believed to function as a char promoter in the intumescent composition.

The expansion gas serves to cause the fire protective composition to foam and swell, i.e., intumesce, when exposed to high temperatures or flames. As a result of this expansion the char which is formed is a thick, multicelled material which serves to insulate and protect the underlying substrate. Preferably, the source of expansion gas is a nitrogen-containing material. Examples of suitable nitrogen-containing materials include melamine, methylolated melamine, hexamethoxymethyl melamine, urea, dimethylurea, melamine pyrophosphate, dicyandiamide, guanylurea phosphate and glycine. Preferably, melamine is utilized. Other conventional sources of expansion gas can also be used such as those materials which liberate carbon dioxide. The source of expansion gas is usually present in the compositions of the present invention in an amount ranging from 0.1 to 25 percent by weight, preferably 1 to 10 percent by weight, the percentages being based upon the total weight of the epoxy resin, curing agent, and the additive component.

The source of zinc can be selected from a variety of materials. It is believed that the zinc material contributes to the formation of a small-celled structure in the char. The small cells of the char afford better insulation for the substrate and are better able to retain the char's integrity and adhere to the substrate even in the absence of external reinforcing materials. Thus, cracking of the char and its breaking away from the substrate are minimized and a greater measure of protection is afforded to the underlying steel. Examples of suitable materials which are sources of the zinc include zinc oxide, zinc salts such as zinc borate and zinc phosphate; zinc carbonate; also zinc metal can be used. Preferably, zinc borate is utilized. Usually the claimed intumescent composition contains an amount of zinc which ranges from about 0.1 to 25 percent by weight, preferably 0.5 to 12 percent weight, the percentages being based upon the total weight of the epoxy resin, curing agent and the additive component.

The source of boron is preferably ammonium pentaborate or zinc borate although a large variety of other materials can be utilized. Examples of suitable materials which can provide boron include boron oxide, borates such as sodium borate, potassium borate and ammonium borate, also borate esters such as butyl borates or phenyl borates. The claimed intumescent composition usually contains an amount of boron with ranges from about 0.1 to 10 percent by weight, preferably 1 to 6 percent by weight, the percentages being based upon the total weight of the epoxy resin, curing agent and the additive component.

It should be understood that the phosphorus, zinc, boron, and expansion gas can each be provided by a separate source material or alternatively a single material may be a source of more than one of the aforelisted element. For example, melamine pyrophosphate can provide a source of both phosphorus and expansion gas.

The reinforcing filler when presently the additive component can be chosen from among a large array of conventionally utilized materials including fibrous reinforcements and platelet reinforcements which are preferred over other fillers. Examples of fibrous reinforcements include glass fibers, ceramic fibers, e.g., aluminum oxide/silicon oxide, and graphite fibers. Platelet reinforcements include hammer-mill glass flakes, mica, and wollastonite. Other suitable fillers include clay, talc, silica, and various pigments. Preferably, wollastonite is utilized. The reinforcing filler is believed to assist in controlling expansion of the fire protective composition prior to and during char formation so that the resultant char is hard and uniform. When present, the reinforcing filler is usually present in the composition in an amount ranging from about 1 to 50 percent by weight, the percentages being based upon the total weight of the epoxy adduct, curing agent and the additive component.

The fire protective intumescent composition of the present invention is preferably a two-package system with the epoxy adduct in one package, the curing agent in a second package and the additive component in either the epoxy resin package or the curing agent package or in both packages. When the additive component is present in both packages the individual constituents can be in either package, as desired. The individual packages are mixed prior to use such that the epoxy to amine equivalent ratio in the resultant composition is within the broad range set forth above. The intumescent composition of the present invention can also be prepared as a single-package system. In this situation a blocked or latent curing agent would be preferred such as, for example, the ketimine curing agents which have been mentioned above. The ketimine blocked curing agents cure as a result of exposure to moisture which causes hydrolysis of the ketimine and release of the free amine curing agent. Other latent curing agents can also be utilized such as those in which the free amine curing agent is liberated as a result of exposure to radiation.

The composition of the present invention can also contain a variety of conventional additives such as stabilizers, rheology control agents, flame spread control agents, and the like. These ingredients are, of course, optional and can be added in varying amounts.

The intumescent curable composition of the present invention when it is prepared is usually in the form of a thick material such as a mastic. It is preferred that the composition be solvent free and spray applied. If desired, thinning can be accomplished with a variety of conventional solvents such as methylene chloride or 1,1,1-trichloroethane.

The intumescent curable compositions of the present invention are particularly advantageous in that they can be applied to a variety of substrates particularly steel substrates and when subjected to extreme variations in temperature over a short period of time do not exhibit cracking. The absence of cracking results in improved adhesion of the composition to the substrate. This ultimately enhances the protection of the substrate should a fire occur. A cured coating in the unburned state which is crack-free is better able to remain adhered to the substrate upon burning and forming a char. Therefore, the claimed compositions are particularly advantageous in providing a substrate which demonstrates a reduced rate of temperature rise when it is subjected to fire conditions.

The following examples are intended to be illustrative of the invention and are not intended to be limiting.

EXAMPLE A

Flexibilized Epoxy Resin

This example illustrates the preparation of the flexibilized epoxy resin.

Into a 5,000 ml 4-neck round bottom flask were charged 235 g of azelaic acid[1], 265 g of diethylene glycol[2], 862.5 g dodecane dioic acid[3] and 2.7 g of butyl stannoic acid[4]. The flask was equipped with a nitrogen blanket and an air motor using a paddle blade stirrer. The contents of the flask were heated over a period of 20 minutes to 121° C. at which temperature the contents of the flask were sufficiently melted to start the agitation and to begin the nitrogen sparge. The flask was fitted with a glycol recovery condenser, a Dean-Stark trap and a cold water condenser. The reactants were heated over a period of 5 hours and 15 minutes to 175° C. during which time distillate (water) was removed and the acid value was followed. The reaction was held at 175° C. for an additional 2 and ½ hours until the acid value reached 217. At this point the reaction was cooled to 100° C., and 650 g of Heloxy WC-67[5], 1800 g Epon 828[6] and 11.3 g ethyl triphenyl phosphonium iodide[7] were added. Following a moderately exothermic reaction, the temperature of the reaction was adjusted to 90° C. and held for 5 hours at which time the acid value was 0.23. The flexibilized epoxy resin was then poured into a can and saved for future use.

[1] Azelaic acid is available from Henkel.
[2] Diethylene glycol is available from Union Carbide.
[3] Dodecane dioic acid is available from E.I. Dupont de Nemours.
[4] Butyl stannoic acid is available from Yoshitomi Pharmaceutical Industries Ltd.
[5] Heloxy WC-67 is available from Wilimington Chemical Co.
[6] Epon 828 is available from Shell Chemical Company.
[7] Ethyl triphenyl phosphonium iodide is available from Cincinnati Milcron Chemical.

EXAMPLE B

Urethane Acrylate

This example illustrates the preparation of a urethane acrylate.

Into a 5,000 ml 4-neck round bottom flask was charged 1218 g of toluene diisocyanate (mixed isomers)[1]. The flask was equipped with an air sparge (dry air) and an air motor using a paddle blade stirrer. The contents of the flask were heated to 30° C. and a solution of 1.4 g methyl hydroquinone[2] in 812 g 2-hydroxy ethyl acrylate[3] was slowly added over a period of 34 minutes while maintaining the reaction temperature in the 30°–35° C. range with a water-ice bath. The reaction mixture was held for 30 minutes at 35°–40° C., then 0.3 g of dibutyltin dilaurate[4] was added and the reaction mixture held for 1 hour at 60°–65° C. Over a period of 5 minutes, 698.4 g of tetramethylene glycol[5] was added and allowed to exotherm for ½ hour while keeping the temperature below 100° C. The reactants were then held at 100° C. for 5 hours and 20 minutes at which time an IR Spectrum showed a small NCO peak. An additional 2.3 g of methyl hydroquinone was added to the reaction mixture followed by 1821.7 g of tetraethylene glycol diacrylate[6]. After mixing, the product was poured into a can and saved for future use.

[1] Toluene diisocyanate is available from Mobay Chemical Corporation.
[2] Methyl hydroquinone is available from Eastman Kodak.
[3] 2-hydroxy ethyl acrylate is available from Rohm & Haas Co.
[4] Dibutyltin dilaurate is available from CasChem, Inc.
[5] Tetraethylene glycol is available from Union Carbide.
[6] Tetraethylene glycol diacrylate is available from Radcure Specialities.

EXAMPLE 1

This example illustrates the preparation and testing of a preferred fire protective intumescent curable composition of the present invention. This example utilized a flexibilized polyepoxide.

| Ingredients | | Parts by Weight (grams) |
|---|---|---|
| Package 1: | Flexibilized epoxy[1] | 29.39 |
| | EPON 828[2] | 9.58 |
| | Tris(2-chloroethyl) phosphate[3] | 13.47 |
| | ATTAGEL-50[4] | 1.50 |
| | Thixatrol ST[5] | 1.50 |
| | PHOS-CHEK-P-30[6] | 3.98 |
| | Ammonium Pentaborate | 8.41 |
| | Zinc borate[7] | 15.14 |
| | Wollastonite[8] | 8.97 |
| | Pentaerythritol | 3.98 |
| | Calcium Carbonate | 4.08 |
| Package 2: | VERSAMID 150[9] | 45.79 |
| | Nonyl phenol | 13.57 |
| | ATTAGEL-50 | 5.49 |
| | Wollastonite | 18.08 |
| | Calcium carbonate | 5.49 |
| | Melamine | 11.52 |
| | Carbon black pigment | 0.06 |

[1] This flexibilized epoxy was prepared as described in Example A.
[2] This aromatic epoxy resin was prepared from bisphenol A and epichlorohydrin. It has an epoxy equivalent weight of 190 to 192 and a resin solids content of 100 percent. This resin is commercially available from Shell Chemical Co.
[3] Commercially available from Stauffer.
[4] Attapulgite clay was used herein as a rheology control agent. This material is commercially available from Englehard minerals.
[5] Hydrogenated castor oil derivative was used as a rheology control agent. This material is commercially available from NC Industries.
[6] Ammonium polyphosphate having a phosphorus content of 32 percent by weight. It is commercially available from Monsanto Corporation.
[7] Commercially available as Firebrake ZB from U.S. Borax.
[8] This fibrous reinforcing filler is commercially available from NYCO as NYAD G.
[9] This amine curing agent has an average amine equivalent weight of 149. It is commercially available from Henkel.

The curable intumescent composition was prepared by mixing together 2.015 parts by weight of Package 1 with 1 part by weight of Package 2. The composition was applied to a 1 foot section of a 4W13 I-beam at a uniform thickness of 0.5 inch (12.7 millimeters). The coated beam was cured at ambient temperature for 16 hours and force cured for 5 days at 60° C. The coated beam was then subjected to the following cold cycle test. One cycle of the test involved placing the coated beam in a freezer operating at a temperature between 0° F. (−18° C.) and −10° F. (−23° C.) for sufficient time for the steel to reach a temperature between 0° F. (−18° C.) and −10° F. (−23° C.) as determined by the two thermocouples attached to the beam surface beneath the coating. (In this particular example, the thermocouples were not used. The beam was placed in the freezer for 16 hours). The beam was then removed from the freezer and a 50 square inch area (0.0323 square meter) of the surface warmed as shown by FIG. 1 by passing a heat gun [Model No. HG 50146, Alpha Division of Loral Corporation, 14 amp, minimum temperature at tip 572° F. (297° C.)] a distance of (0.5 inch) 12.7 millimeters from the surface, uniformly over the surface until the surface temperature reached 60° C. within a 3 minute period, as determined by a thermocouple moved about the surface. The beam was then allowed to stand at ambient temperature for at least 2 hours.

The beam was able to withstand 29 cycles without cracking. After 30 cycles some cracking was observed.

The curable composition, prepared and mixed as above, was also tested for burn properties. The composition was applied to a 9 inch×9 inch×½ inch (22860 mm×22860 mm×12.7 mm) steel plate having two thermocouples embedded in it such that the top, bottom, and sides were uniformly covered with a 0.3 inch (762 mm) coating. The plate was allowed to cure for 24 hours at room temperature followed by 24 hours at 140° F. (60° C.) and then burned in a gas fired furnace according to ASTM-E119 (UL-263). The variable measured was the length of time required for the steel to reach a temperature of 1000° F. (538° C.). The test was concluded when the steel reached this temperature [The temperature of the steel was measured by each of the thermocouples. When more than one thermocouple was utilized the average of all the thermocouples was taken with the proviso that each individual thermocouple cannot exceed a temperature of 1200° F. (649° C.).]

The following data was obtained:
Thermocouple 1: 58:55 (minutes:seconds) to reach a temperature of 1000° F. (538° C.)
Thermocouple 2: 59:27 to reach a temperature of 1000° F. (538° C.)

The average time required to reach the conclusion of the test was 59:16. The resultant char was hard, exhibited good expansion, and had small round cells. The control plate was identical to the coated plate in all respects except that it was not coated with the curable composition. The uncoated 9 inch×9 inch×½ inch steel plate required 13 minutes to reach a temperature of 1000° F. (538° C.).

The curable composition was also burned in a gas fired furnace according to UL1709 conditions. This is a rapid rise fire test in which the furnace temperature reaches 2000° F. in 5 minutes. The furnace is maintained at 2000° F. for the duration of the test. A 9"×9"×½" plate with the curable composition was prepared as described above. The coated plate was allowed to cure for 16 hours at room temperature and 2 hours at 140° F. (60° C.). The sample was burned according to UL1709. The variable measured was the length of time required for the steel to reach a temperature of 1000° F. (538° C.). The test was concluded when the steel reached this temperature. [The temperature of the steel was measured by each of the thermocouples]. When more than one thermocouple was utilized, the average of all the thermocouples was taken with the proviso that each thermocouple can not exceed a temperature of 1200° F. (648° C.).

The following data was obtained:

Thermocouple 1: 35:36 (minutes:seconds) to reach a temperature of 1000° F. (538° C.)
Thermocouple 2: 37:38 to reach a temperature of 1000° F. (538° C.)

The average time to reach a temperature of 1000° F. (538° C.) was 36:37. The resultant char was hard, exhibited good expansion and has small round cells. The control plate was identical to the coated plate except that it was not coated with the curable composition. The uncoated 9"×9"×½" steel plate required 4 minutes and 8 seconds to reach a temperature of 1000° F. (538°).

The coated I-beam which was subjected to the cold cycle test was then burned in a gas fired furnace according to UL1709 as described above. This I-beam did not contain thermocouples prior to application of the coating. The burn test was concluded at the end of 55 minutes and the resultant char was examined visually. The char was hard, exhibited good expansion and had small cells.

EXAMPLE 2

This example illustrates the preparation and testing of a flexibilized fire protective intumescent curable composition of the present invention. This example demonstrates the use of a flexible material which co-cures with an epoxy resin to achieve cold cycle crack resistance.

|  | Ingredients | Parts by Weight (grams) |
| --- | --- | --- |
| Package 1: | EPON 828 | 11.86 |
|  | Urethane Acrylate[13] | 29.63 |
|  | Tris(2-chloroethyl) phosphate | 9.70 |
|  | PHOS-CHEK-P-30 | 2.87 |
|  | Zinc borate | 10.91 |
|  | Calcium carbonate | 16.17 |
|  | Melamine | 2.16 |
|  | ATTAGEL-50 | 1.08 |
|  | Wollastonite | 8.62 |
|  | ZEEOSPHERES[14] | 6.98 |
|  | Carbon black pigment | 0.02 |
| Package 2: | Nonyl phenol | 62.07 |
|  | Triethylene tetramine | 37.93 |

[13]Urethane acrylate was prepared in resin Example B.
[14]ZEEOSPHERE 800 is a silica-alumina hollow sphere with an average particle size of 30 microns available from ZEELAN Industries, Inc.

The composition was prepared by mixing together 12.793 parts by weight of Package 1 with 1 part by weight of Package 2. The composition was uniformly applied at a thickness of 0.5 inch (12.7 millimeter) to a 10 inch (0.254 meter) length of a 4W13 I-beam. The coated beam was allowed to cure at ambient temperature for 16 hours, then force cured at 140° F. (60° C.) for 5 days. The Shore D hardness of the coating was 52. The coated beam was then subjected to the cold cycle test as described above.

The beam was subjected to 27 cycles of the cycle test before the cycle testing was terminated. After 27 cycles no cracking had occurred.

The coated I-beam which had been subjected to the cold cycle test was then burned in a gas fired furnace according to UL1709 conditions as described in Example 1.

The following data was obtained:
Thermocouple 1: 38:18 (minutes:seconds) to reach a temperature of 1000° F. (538° C.)
Thermocouple 2: 40:40 to reach a temperature of 1000° F. (538° C.)

The average time to reach the conclusion of the test was 39:29. The resultant char was hard and exhibited much expansion and a variable char density. The control I-beam was identical to the coated beam in all respects except that it was not coated with the curable composition. The uncoated 10" 4W13 I-beam required 3 minutes and 40 seconds to reach a temperature of 1000° F. (538° C.).

EXAMPLE 3

This example illustrates the preparation and testing of a flexibilized fire protective intumescent curable composition of the present invention. This example demonstrates the use of a flexible epoxy curing agent to achieve cold crack resistance.

|  | Ingredients | Parts by Weight (grams) |
|---|---|---|
| Package 1: | EPON 828 | 23.21 |
|  | Tris(2-chloroethyl) phosphate | 12.74 |
|  | PHOS-CHEK-P-30 | 3.76 |
|  | Zinc borate | 14.32 |
|  | Calcium carbonate | 21.23 |
|  | Melamine | 2.83 |
|  | ATTAGEL-50 | 1.42 |
|  | Wollastonite | 11.32 |
|  | ZEEOSPHERES | 9.15 |
|  | Carbon black pigment | 0.02 |
| Package 2: | Nonyl phenol | 15.34 |
|  | VERSAMID 150 | 27.99 |
|  | JEFFAMINE D-2000[15] | 56.67 |

[15]JEFFAMINE D-2000 is an amine terminated polypropylene glycol of approximately 2,000 molecular weight commercially available from Wilmington Chemical Co.

The intumescent composition was prepared by mixing together 2.41 parts by weight of Package 1 with 1 part by weight of Package 2. The composition was uniformly applied at a thickness of 0.5 inch (12.9 millimeter) to a 4W13 I-beam which was 10 inches long. The coated beam was allowed to cure at room temperature for 16 hours then heat aged at 140° F. (60° C.) for 5 days. The Shore D hardness of the coating was 46. The coated beam was then subjected to the cold cycle test as described above.

The beam was subjected to 27 cycles of the test before cycle testing was terminated. After 27 cycles no cracking had occurred.

The coated I-beam which had been subjected to the cold cycle test was then burned in a gas fired furnace according to UL1709 conditions as described in Example 1.

The following date was obtained:

Thermocouple 1: 44:53 (minutes:seconds) to reach a temperature of 1000° F. (538° C.)
Thermocouple 2: 47:27 to reach a temperature of 1000° F. (538° C.)

The average time to reach the conclusion of the test was 46:10. The resultant char was hard, exhibited good expansion and had small round cells.

What is claimed is:

1. A substrate which demonstrates a reduced rate of temperature rise when it is subjected to fire conditions, characterized by having applied on the substrate surface a curable composition which when exposed to fire conditions intumesces, said composition comprising:
   (a) an epoxy functional adduct of a flexible acid functional polyester with a polyepoxide;
   (b) a curing agent adapted to cure the epoxy functional adduct; and
   (c) an additive component comprising a mixture of materials adapted to provide a source of
      (i) zinc,
      (ii) boron,
      (iii) phosphorus, and
      (iv) an expansion gas upon thermal decomposition, said composition being capable of forming a carbonaceous char upon exposure to heat or flame, with the proviso that the cured, unburned composition has sufficient flexibility that it passes at least 10 continuous cycles of a cold cycle test without cracking when the composition is applied at a thickness of 0.5 inch (12.7 millimeters) to a 10 inch (0.254 meter) section of a 4W13 I-beam having two thermocouples attached to the surface, allowed to cure at ambient temperature for 16 hours, force cured for 5 days at about 60° C. and subjected to the cold cycle test wherein for one cycle the beam is placed in a freezer operating at a temperature between about 0° F. (−18° C.) and about −10° F. (−23° C.) for sufficient time for the steel to reach a temperature between about 0° F. (−18° C.) and about (−10° F.) −23° C. as determined by the two thermocouples attached to the surface of the beam beneath the coating, removed from the freezer and a 50 square inch area (0.0323 square meter) of the surface warmed by passing a heat gun, 14 amps, minimum temperature at tip 500° F. (260° C.) at a distance of 0.5 inch (12.7 millimeter) from the surface, uniformly over the surface until the surface temperature reaches 110° F. (43° C.) within a 3 minute period, as determined by a thermocouple moved about the surface, and allowed to stand for at least 2 hours at ambient temperature.

* * * * *